C. H. KUGLER.
YIELDABLE CONNECTING ROD.
APPLICATION FILED APR. 14, 1919.
1,389,055.
Patented Aug. 30, 1921.
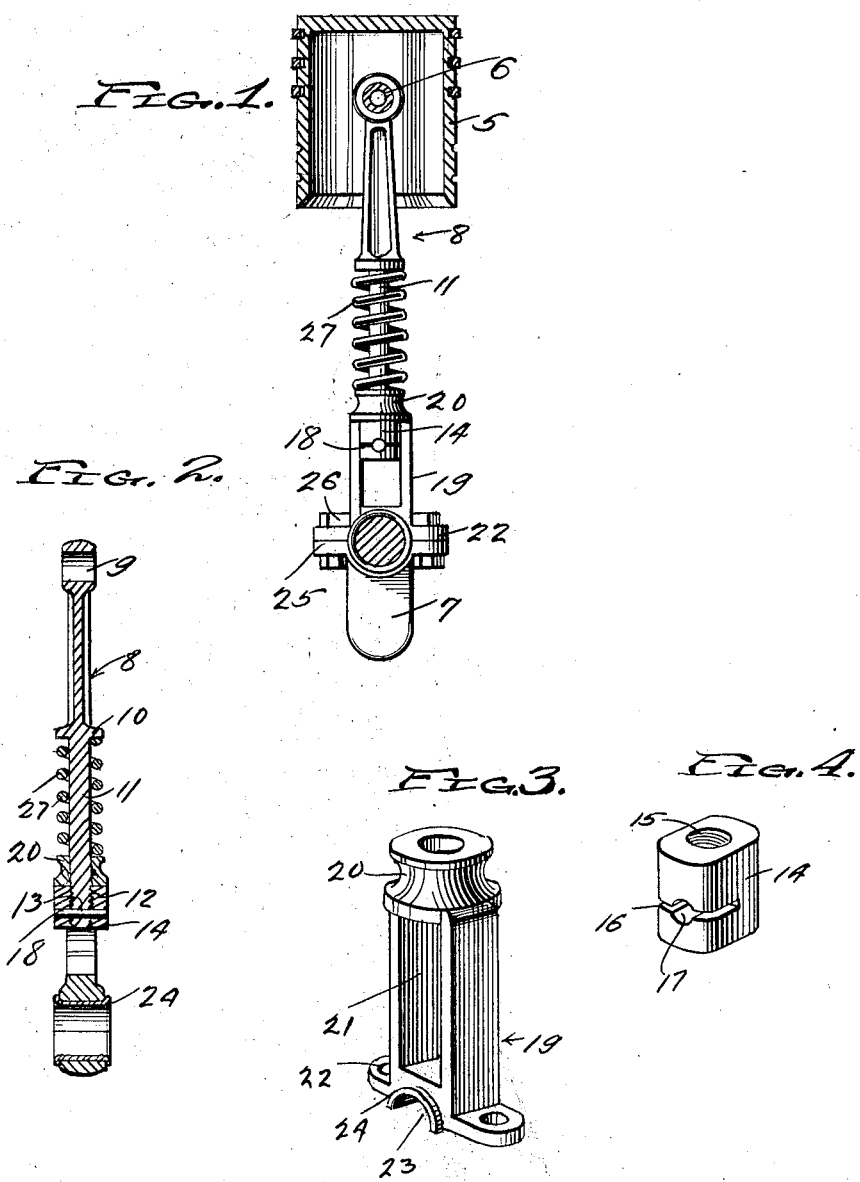

UNITED STATES PATENT OFFICE.

CHARLES H. KUGLER, OF LEXINGTON, NEBRASKA.

YIELDABLE CONNECTING-ROD.

1,389,055.  Specification of Letters Patent.  Patented Aug. 30, 1921.

Application filed April 14, 1919. Serial No. 290,070.

*To all whom it may concern:*

Be it known that I, CHARLES H. KUGLER, citizen of the United States, residing at Lexington, in the county of Dawson and State of Nebraska, have invented certain new and useful Improvements in Yieldable Connecting-Rods, of which the following is a specification.

My invention relates to new and useful improvements in connecting rods, and more particularly to that type which are yieldable.

An important object of my invention is the provision of a yieldable connecting rod capable of absorbing shocks and jars which are imposed upon the bearings on both ends of the rod, and in case the connecting rod is used in connection with an internal combustion engine, the yieldable connecting rod will prevent the shock from injuring the engine and from damaging the crank shaft or its bearings.

Another important object of my invention resides in the provision of a yieldable connecting rod having its various parts so constructed and assembled that they may be detached without disconnecting the rod from the driving element.

Another object of my invention resides in the provision of a device of the above mentioned character embodying a guide head which is so constructed and correlated with another part of the device that the rod will yield correctly thereby eliminating the possibility of the rod or its associated parts becoming damaged.

Other objects and advantages will become apparent during the course of the following description.

The invention also consists in certain other features of construction and in the combination and arrangement of the several parts to be hereinafter fully described and specifically pointed out in the appended claim.

In the accompanying drawings forming a part of the description, and wherein like numerals are employed to designate like parts throughout several views, Figure 1 is a side elevation of my invention as applied to a piston and crank shaft used in connection with internal combustion.

Fig. 2 is a vertical section through the invention.

Fig. 3 is an enlarged perspective view of the guide cage and,

Fig. 4 is an enlarged perspective view of the guide head.

While I have shown my invention, in the present instance, used in connection with an internal combustion engine, I desire it to be understood that I do not care to restrict my invention to this use, as it may be as a transmission element for forming an operative connection between any driving element and any driven element.

In the accompanying drawings, wherein is shown a preferred embodiment of my invention, the numeral 5 designates a piston of the usual construction, and which is equipped with the usual wrist pin 6. One end of my connecting rod is connected with the wrist pin 6, while the opposite end of the rod is connected with a crank shaft 7.

My yieldable connecting rod, indicated generally by the numeral 8 is provided at one end with a bearing 9, which in the present instance is associated with the wrist pin 6. Substantially intermediate the ends of the rod 8, I provide an annular flange or shoulder 10, for a purpose which will hereinafter appear. An integral stem 11 extends from the flange 10 to form the other half of the connecting rod. The free end of this stem is provided with screw threads 12, and through this threaded end I provide a diametrically extending opening 13.

Adapted to be threaded upon the threads 12, is a substantially rectangular guide head 14, which is more clearly shown in Fig. 4. This head is of course provided with an axially extending threaded bore 15 so that it may be received upon the threaded end of the stem 11. To provide additional securing means for connecting the guide head with the stem, I provide the head with a transverse slit 16, which extends halfway through the head. An opening 17 extends transversely through the head and passes through the threaded bore 15, while the slit 16 extends diametrically across the opening and communicates therewith. A pin 18 is adapted to pass through the opening 17 and the opening 13 in the stem for preventing the head 14 from becoming disengaged from the stem. This pin 18 is of such diameter that when it is inserted in the opening 17 it causes the portions of the head on opposite sides of the slit to move slightly apart whereby the pin is wedged in said opening and securely retained therein.

A guide cage 19 is provided with a head 20 having an axially extending opening therethrough and by which it is slidably mounted upon the stem 11 above the guide head 14. The body portion of this cage is provided with a longitudinally extending slot 21, in which operates the guide head 14. Opposite sides of the head 14 engage opposite sides of the slot 21 so that the cage cannot turn upon the stem 11 and whereby the connecting rod will yield correctly without the possibility of causing a great amount of friction or breakage of any of the parts. The end of the cage opposite the head 20 is provided with a pair of transversely extending ears 22. A semi-circular recess 23 is also provided in this end of the cage and extends at right angles to the ears. Upon opposite faces of the cage I surround the recess 23 with outwardly extending semi-circular flanges 24 to form additional bearing surfaces.

The other half of the separable bearing consists of a plate having oppositely disposed ears 25 and a semi-circular recess between the ears to co-act with the recess 23 in the cage. The ears 25 and 22 are provided with alined openings for the reception of bolts 26 to retain the bearing in engagement with the crank shaft 7.

The means for taking up shocks and jars transmitted through the connecting rod, is in the form of a coiled spring 27, which surrounds the stem 11. One end of the spring abuts with the annular flange 10, while the opposite end abuts with the head 20 of the cage 19. This spring is of such strength that it cannot be compressed under the strain of the ordinary driving force imposed thereupon.

In use, when there is a strain imposed upon the connecting rod, or the crank shaft 7 receives a jolt, the cage 19 will be caused to move upwardly upon the stem against the tension of the coil spring 27 which will absorb the shock and replace the cage to its normal position after the shock has been absorbed or taken up. When there is any jerky down stroke of the piston directly against the shaft 7, the stem 11 will move downwardly to the head of the cage which in turn will cause the guide head 14 to slide in the slot 21, which will of course compress the spring.

The foregoing description and the drawings have reference to what may be considered the preferred or the approved form of invention. It is to be understood that I may make such changes in construction and arrangement and combination of parts, materials, dimensions, etc., as may prove expedient or fall within the scope of the appended claim.

Having thus fully described my invention, what I claim as new and desire to secure Letters Patent is:

A yieldable connecting element comprising a rod having one free end screwthreaded, an abutment on the rod spaced from the ends thereof, a guide head threaded upon the threaded end of said rod and having flat sides, a guide cage having an axially extended opening in its inner end to receive one end of said rod, and provided with a slot for the reception of the guide head, the flat side of said head being adapted to engage opposite sides of the slot, whereby the head may be removed from the rod by turning the cage, and a coiled spring on the rod between the abutment thereon and the inner end of the cage.

In testimony whereof I affix my signature in presence of two witnesses.

CHARLES H. KUGLER.

Witnesses:
H. L. TEMPLE,
H. T. MOWRY.